United States Patent [19]

Irwin

[11] Patent Number: 5,092,187
[45] Date of Patent: Mar. 3, 1992

[54] AUXILIARY TRANSMISSION SHIFT CONTROL SYSTEM

[75] Inventor: James M. Irwin, Rochester, Mich.

[73] Assignee: Rockwell International Corporation, Pittsburgh, Pa.

[21] Appl. No.: 610,596

[22] Filed: Nov. 8, 1990

[51] Int. Cl.5 .............................................. F16H 59/00
[52] U.S. Cl. ........................................ 74/335; 74/867
[58] Field of Search ................. 74/331, 867, 745, 477, 74/335

[56] References Cited

U.S. PATENT DOCUMENTS

| | | | |
|---|---|---|---|
| 3,283,613 | 11/1966 | Perkins | 74/745 |
| 3,407,676 | 10/1968 | Magg | 74/335 |
| 3,516,287 | 6/1970 | Masuda et al. | 74/335 |
| 3,552,235 | 8/1968 | Szodfridt | 74/867 X |
| 3,648,546 | 3/1972 | McNamara et al. | 74/331 X |
| 4,974,474 | 12/1990 | Newbigging | 74/867 |

Primary Examiner—Leslie A. Braun
Assistant Examiner—Ryan W. Massey

[57] ABSTRACT

An auxiliary transmission shift control system which combines the pressurized air supply lines for the range and splitter control switches mounted on the gear range selector lever in the vehicle cab and, therefore, eliminates one pressurized supply line. The interlock function (preventing shifting the splitter ON while in LOW range) is accomplished by preventing depressurization of the OFF side of the splitter cylinder if the range cylinder is in LOW position. Depressurization is prevented by pressurizing the OFF side of the splitter cylinder via a passageway connecting with the LOW side of the range cylinder.

2 Claims, 4 Drawing Sheets

AUXILIARY TRANSMISSION SHIFT CONTROL SYSTEM

BACKGROUND OF THE INVENTION

1. Field of the Invention

The present invention relates generally to systems for controlling gear selection in compound transmissions and, particularly, to systems for accomplishing gear selection on auxiliary transmissions.

2. Description of the Prior Art

Transmissions providing a plurality of selectable gear ratios between input and output are in common use in transportation. Compound change gear transmissions of the type having one or more auxillary sections connected in series with the main transmission section are also in common use in transportation. One example of a compound change gear transmission in one having a single combined range/splitter type auxiliary section. Examples of such transmissions may be seen in U.S. Pat. Nos. 3,283,613 and 3,648,546.

The main section of such transmissions are shifted by manually selectable gear shift mechanisms. An Operator accomplishes gear selection by shifting a gear shift lever. Auxiliary sections of such transmissions are typically shifted by two independent air cylinders; a range cylinder and a splitter cylinder. The range cylinder is used to position the transmission in LOW or HIGH range. The splitter cylinder is used to position the splitter in ON or OFF position. The splitter cylinder and the range cylinder must be interlocked to coordinate respective gear positioning to assure proper operation. That is; when the range cylinder is in HIGH position, the splitter cylinder may be shifted into either On or OFF position. When the range cylinder is in low position, the splitter must be OFF or shifted to OFF position.

The range cylinder transmissions known in the art are controlled by selectively applying pressure to the LOW or alternatively to the HIGH side of the range cylinder. Thus, when HIGH range has been selected, the HIGH side of the range cylinder will be filled with pressurized air and the LOW side vented to atmosphere. When LOW range has been selected, the reverse occurs.

The splitter cylinder of transmissions known in the art are controlled by continuously applying pressure to a first side and selectively pressurizing or depressurizing the opposing side. The differential in the piston area causes the piston to assume an initial position when both sides are equally pressurized. When one side is depressurized, the pressure on the opposing side acts to displace the piston to the opposite splitter position. An interlock is accomplished, preventing splitter On when in LOW range, by using the pressure from the HI side of the range cylinder to convey the splitter ON command, That is, if the range cylinder is in LOW position, no pressure will be available to communicate the depressurization command to shift the splitter to ON condition. Whereas, if the range cylinder is in HIGH position, pressure will be available to convey the depressurization command to shift the splitter to ON condition.

Thus, the auxiliary section is controlled by two separate air switches which are typically mounted on the transmission main section gear shift lever. One switch receives pressurized air from the system reservoir and selectively delivers pressurized air to a slave valve associated with the range cylinder. The second switch receives pressurized air from the HIGH side of the range cylinder and selectively delivers air to the slave valve associated with the splitter cylinder. To accomplish this objective, four air lines must traverse the wall of the vehicle cab.

It would be appreciated as an improvement if the two supply lines could be combined as one, reducing the total to three while maintaining the interlocking function.

SUMMARY OF THE INVENTION

The present invention combines the pressurized air supply lines for the range and splitter control switches mounted on the gear range shift lever in the vehicle cab and, therefore, eliminates one pressurized supply line. The interlock function (preventing shifting the splitter ON while in LOW range) is accomplished by preventing depressurization of the OFF side of the splitter cylinder if the range cylinder is in LOW position. Depressurization is prevented by pressurizing the OFF side of the splitter cylinder via a passageway connecting with the LOW side of the range cylinder.

The preferred embodiment features a system for controlling the gear selection on a compound transmission including a range gear having a LOW range and a HIGH range position and a splitter gear having a splitter ON and a splitter OFF position comprising a range cylinder having a bore with an axially positionable range piston sealingly defining a LOW range chamber and a High range chamber, a shift bar connected to the range piston and extending from the range cylinder to facilitate range gear positioning means for selectively pressurizing the LOW and HIGH range chambers to position the range piston to accomplish range gear positioning. Additionally, a splitter cylinder having a bore with an axially positionable splitter piston sealingly defining a splitter ON chamber and a splitter OFF chamber is included having a rod connected to the splitter piston which extends from the splitter cylinder to facilitate splitter gear positioning. The splitter cylinder includes means for pressurizing the splitter ON chamber and the splitter OFF chamber to establish an initial position for the splitter piston in which the splitter gear is in OFF position as well as means for selectively connecting the LOW range chamber and the splitter OFF chamber to establish selective venting of the splitter OFF chamber to cause the splitter piston to displace from the initial position to a position in which the splitter gear is in ON position whereby an interlock is accomplished which prevents a splitter ON condition when the LOW range chamber is pressurized. A further embodiment is contemplated including a system for controlling the gear range selection of a compound transmission including a range gear positionable to provide a LOW or HIGH range gear and splitter gear positionable to provide a splitter ON or splitter OFF position comprising mesans for positioning the range gear in LOW or HIGH position including first and second selectively pressurizable opposing chambers divided by a range piston wherein the range piston is connected to the range gear to facilitate positioning thereof to provide LOW range in response to pressurization of the first chamber and HIGH range in response to pressurization of the second chamber. Also included is a means for positioning the splitter gear in ON or OFF position including a third and fourth chamber divided by a splitter piston. Means are included to pressurize the third chamber as well as means for selectively pressurizing or depressurizing the fourth chamber. In this manner the splitter piston which is connected to the splitter gear to facilitate positioning thereof provides a splitter OFF condition upon pressurization of the third and fourth chamber as well as splitter ON condition upon depressurization of the fourth chamber and continued pressurization of the third chamber. The means for depressurizing the fourth chamber includes a valve having a first closed and second open position which permits depressurization of the fourth chamber through the first chamber of the range gear whereby depressurization of the fourth chamber will be prevented and the splitter will remain OFF when the first chamber is pressurized and the range gear is in the LOW range.

These and other aspects of the present invention will become more readily apparent by reference to the following detailed description of the embodiments as shown in the drawings.

DESCRIPTION OF THE PREFERRED EMBODIMENT

Figure 1:
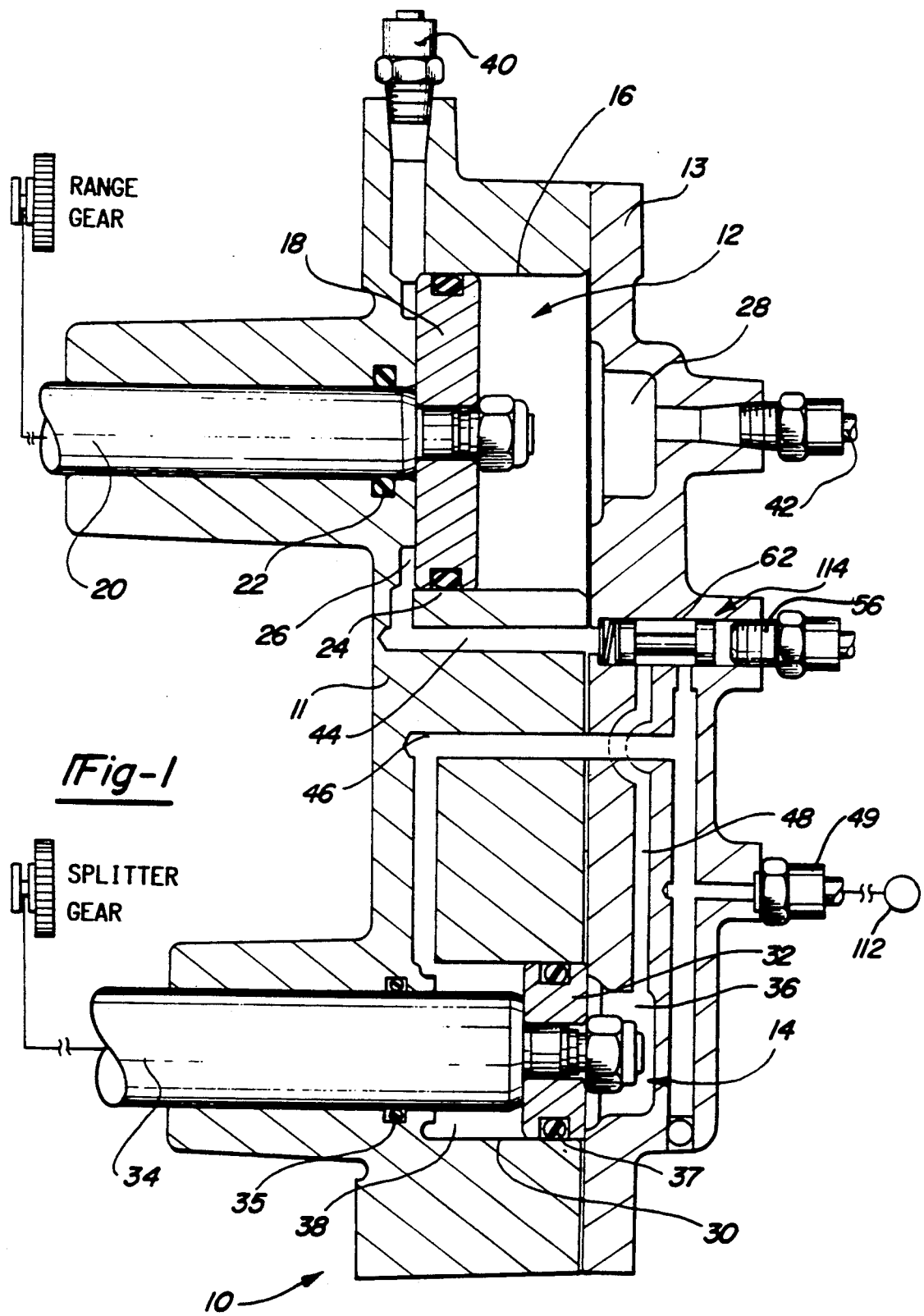
FIG. 1 is a cross-sectional view of an auxiliary transmission shift housing assembly including the pressurizable chambers of the present invention.

The preferred embodiment of the present invention as shown in FIG. 1 includes an auxiliary transmission shift housing assembly 10 including a main housing 11 and a cover plate 13. Range cylinder 12 and splitter cylinder 14 are contained within housing assembly 10.

Range cylinder 12 includes a bore 16 formed in main housing 11, a piston 18 slidably and sealingly received in bore 16 and a shift bar 20. Shift bar 20 engages with a shifting fork and collar (not shown) to accomplish selection of range gears. "O"-rings 22 and 24 received in respective annular grooves provide apropriate sealing so as to define pressurizable chambers; low range chamber 26 and high range chamber 28.

Splitter cylinder 14 includes a bore 30 formed in main housing 11, a piston 32 slidably and sealingly received in bore 30 and a shift bar 34. Shift bar 34 engages with a shifting fork and collar (not shown) to accomplish selection of splitter gears. "O"-rings 35 and 37 received in respective annular grooves provide appropriate sealing so as to define pressurizable chambers; splitter ON chamber 38 and splitter OFF chamber 36.

Range cylinder 12 includes pneumatic connections as follows; pressurize and vent low range chamber via port 40, pressurize and vent high range chamber via port 42, and selective connection of low range chamber 26 to splitter OFF chamber 36 via port 44 and port 48.

Splitter cylinder 14 includes pneumatic conections as follows pressurize splitter ON chamber 38 via ports 46 and 49 and selectively pressurize or vent splitter OFF chamber 36 via port 48. LOW range chamber 26 is selectively connectable to splitter OFF chamber 36 via shuttle valve 114 and ports 44 and 48. Pressurized air is continuously supplied from reservoir 112 via ports 46 and 49. Shuttle valve 50 has as first normal position defined by the pressurized air from port 46 acting on a differential area within the valve and a second position established upon selective application of pressurized air to port 56. Selective application of pressurized air will cause shuttle 114 to move axially in bore 62 to mask and expose ports so as to accomplish a preselected pneumatic logic.

The pneumatic circuit functions to achieve selective shift or range gears between HIGH and LOW. When in HIGH range the splitter gear may be shifted to ON or OFF position. It is critical that, if an attempt is made to shift the transmission into splitter ON mode at the same time the range gear is in LOW range, the shift to splitter ON is prevented. Also if the transmission is in HIGH range and shifted to LOW range while in splitter ON mode, the splitter must be automatically shifted to OFF mode.

Figure 2:
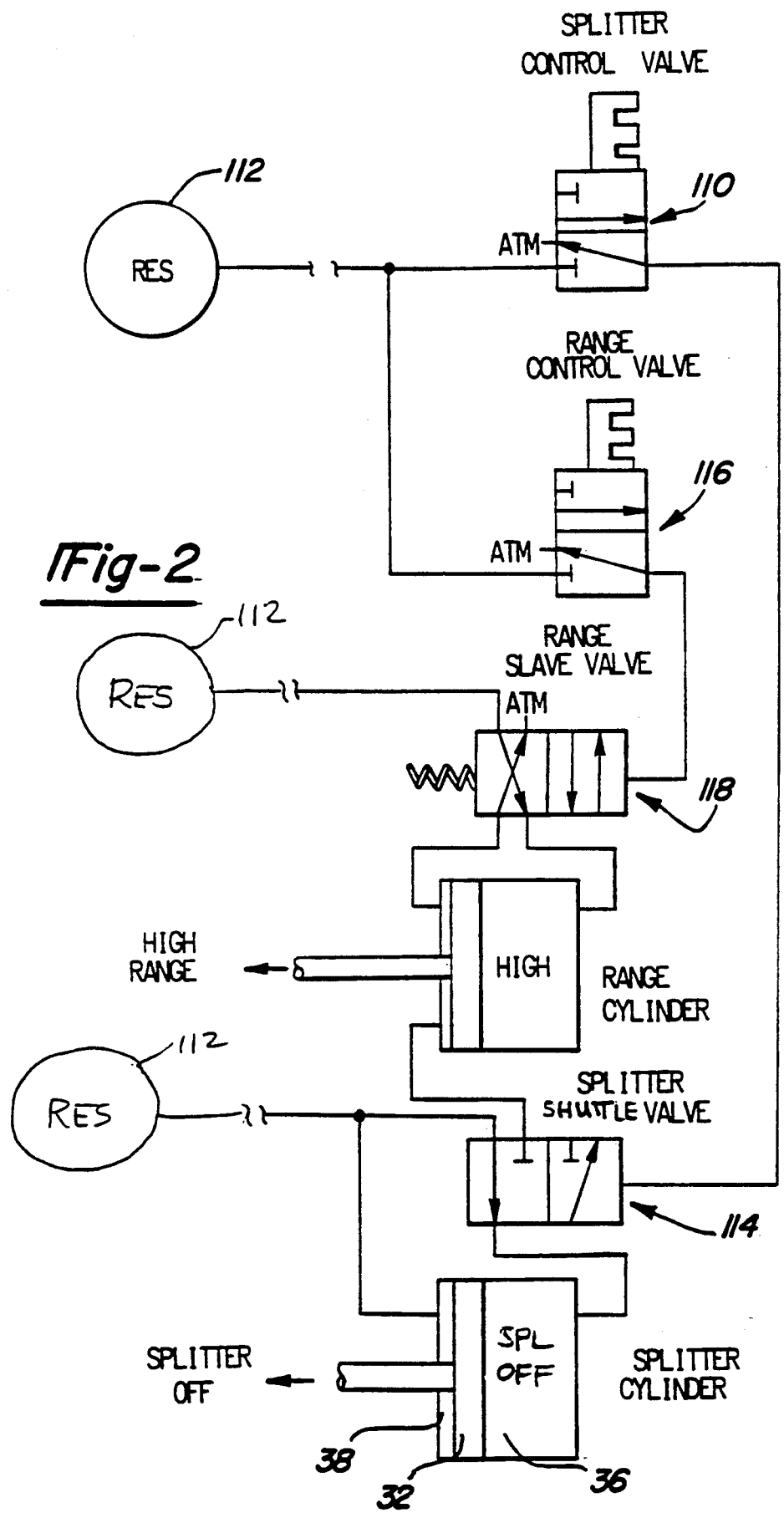
FIG. 2 is a schematic diagram of the present invention in a first mode of operation.

FIG. 2 is a schematic illustration of the preferred embodiment of the present invention including splitter control valve 110 having first and second manually indexable positions. The position shown achieves splitter OFF and HIGH range modes. That is, splitter shuttle valve 114 is positioned with ports aligned so that pressurized air from reservoir 112 is supplied to splitter OFF chamber 36. As pressurized air is continuously supplied to splitter ON chamber 38, piston 32 will be positioned as shown due to the differential in piston surface area exposed to the pressurized air. Splitter ON mode of operation will be described in relation to FIG. 4. Range control valve 116 also has first and second manually indexable positions. The position shown achieves HIGH range mode of operation.

Figure 3:
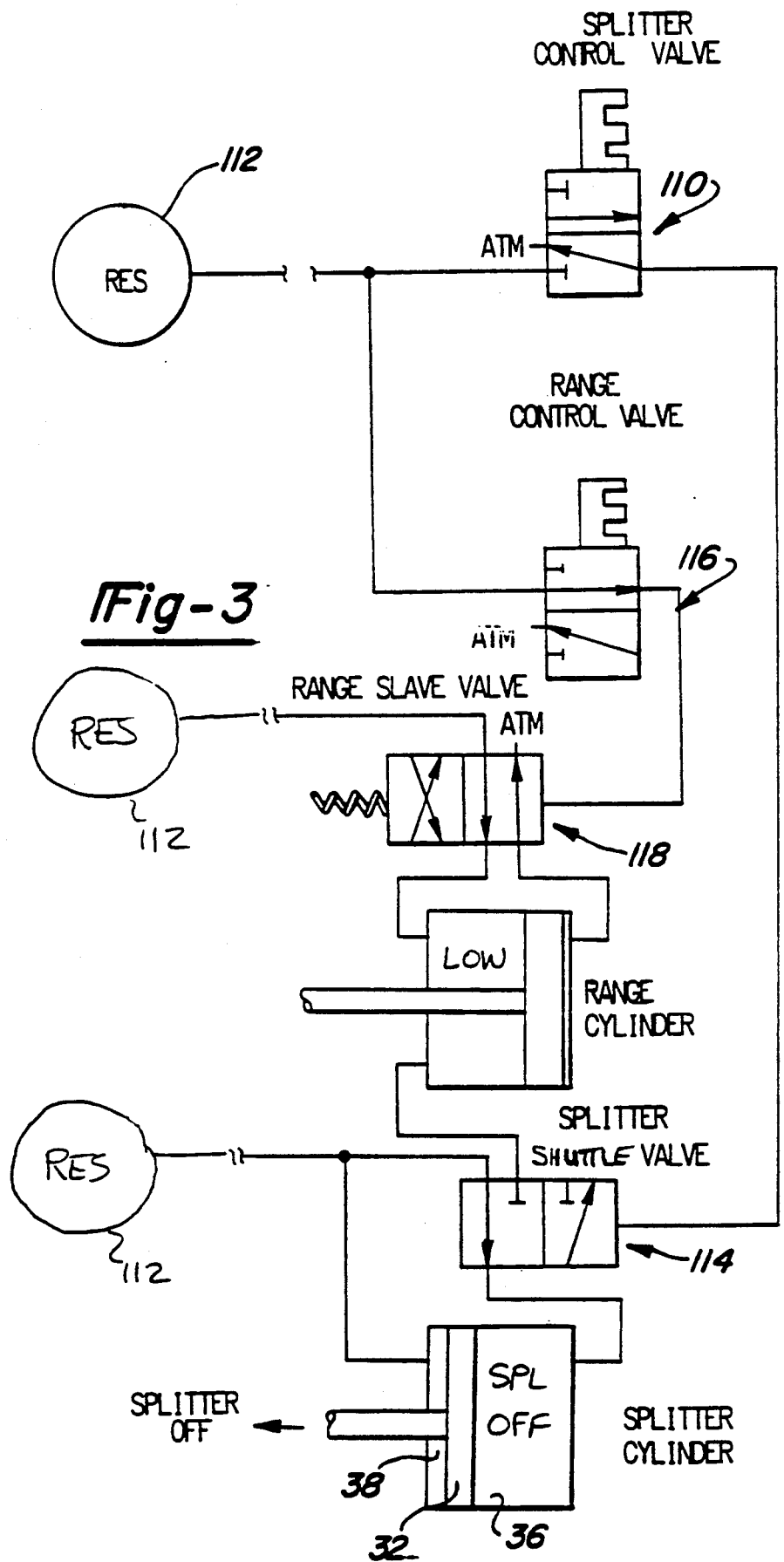
FIG. 3 is a schematic illustration of the present invention in a second mode of operation.

FIG. 3 illustrates the present invention shifted to LOW range with the splitter OFF. A shift to LOW range is accomplished by manually indexing range control valve 116 in such a manner as to align ports to enable pressurized air to flow from reservoir 112 to range slave valve 118 causing range slave valve 118 to shift. Upon shifting of range slave valve 118 ports become aligned to enable pressurized air to flow to LOW range chamber 26. Conjunctively, air is vented from HIGH range chamber 28. Piston 18 will be positioned as shown due to the differential in pressure thereacross.

Figure 4:
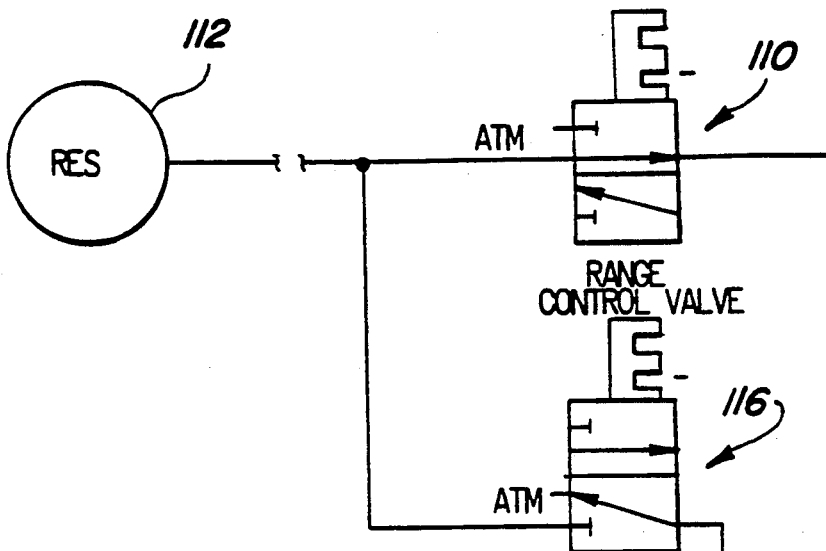
FIG. 4 is a schematic of the present invention in a third mode of operation.
Figure 4:
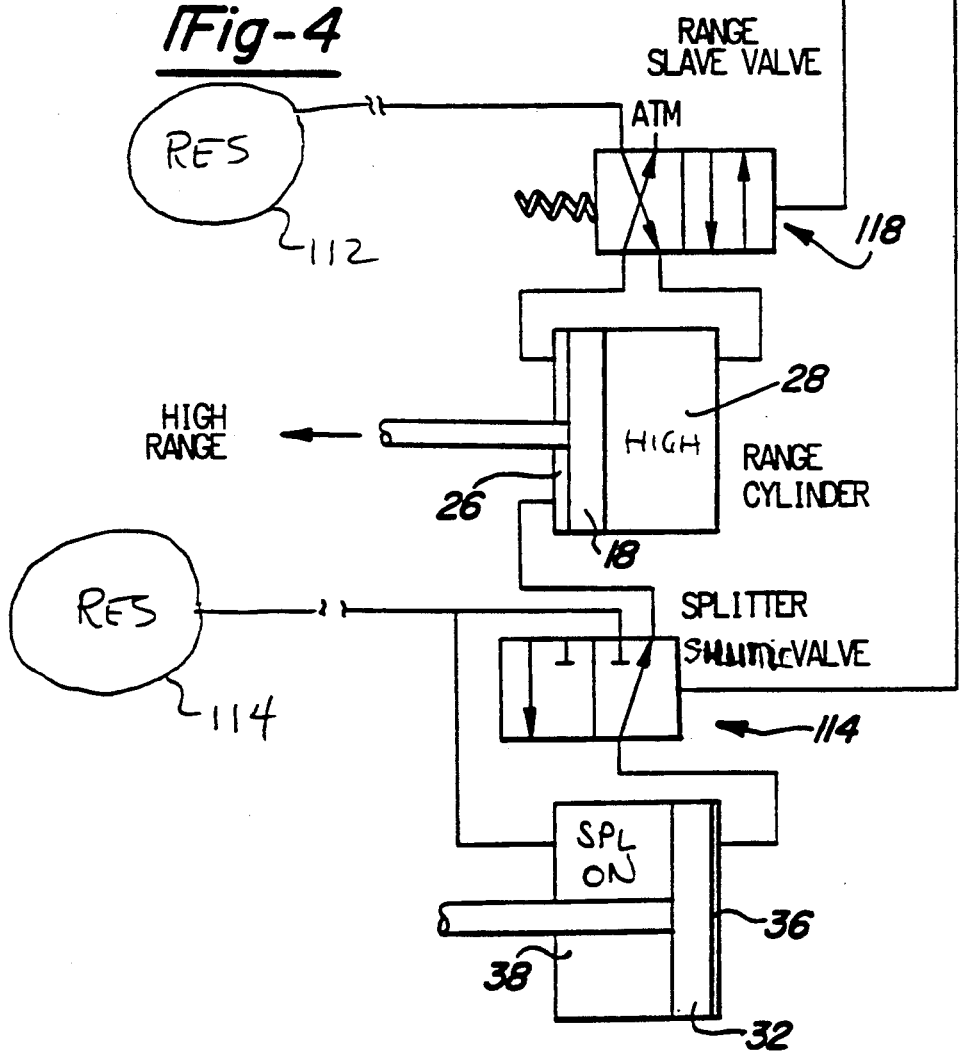

FIG. 4 illustrates the present invention shifted to splitter ON and HIGH range mode of operation. Such a shift is accomplished by manually indexing splitter control valve 110 in such a manner as to align ports to enable pressurized air to flow from reservoir 112 to splitter shuttle valve 114 causing valve 114 to shift. Upon shifting of valve 114, ports become aligned to enable pressurized air to flow from splitter OFF chamber 36 to LOW range chamber 26 and finally to atmosphere.

In this manner, an interlock function is accomplished which prevents a shift to splitter On mode if the auxiliary transmission is in LOW range. That is, if the transmission is in LOW range, the LOW range chamber will be pressurized. If an attempt is made to shift to splitter ON mode, splitter shuttle valve 114 will connect a presurized LOW range chamber 26 to splitter OFF chamber 36 thereby preventing venting of splitter OFF chamber 36. Consequently, piston 32 will remain in the OFF position in spite of a command to shift to splitter ON mode.

In addition, if the transmission is in HIGH range with the splitter ON and a shift is made to LOW range, pressurization of LOW range chamber 26 as required to shift to LOW range will result in pressurization of splitter OFF chamber 36 thereby shifting splitter piston 32 to OFF position.

The selective connection of splitter ON chamber 36 to low range chamber 26 by shuttle valve 114 eliminates one pressurized air supply line connected to splitter control valve 110 thereby minimizing the number of air lines to and from the cab and transmission. In addition, the number of connections required through the cab wall is reduced by one. One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A system for controlling the gear selection on a compound transmission including a range gear having a LOW range and a HIGH range position and a splitter gear having a splitter ON and a splitter OFF position comprising;
   - a range cylinder having a bore with an axially positionable range piston sealingly defining a low range chamber and a high range chamber;
   - a shift bar connected to said range piston and extending from said range cylinder to facilitate range gear positioning;
   - means for selectively pressurizing said low and high range chamber to respectively position said range piston and accomplish range gear positioning in LOW range or HIGH range position;
   - a splitter cylinder having a bore with an axially positionable splitter piston sealingly defining a splitter ON chamber and a splitter OFF chamber;
   - a rod connected to said splitter piston and extending from said splitter cylinder to facilitate splitter gear positioning in splitter ON or splitter OFF position;
   - means for pressurizing said splitter ON chamber and said splitter OFF chamber to define an initial position for said splitter piston in which said splitter gear is in OFF position; and
   - means for selectively connecting said low range chamber and said splitter OFF chamber to accomplish selective venting of said splitter OFF chamber to cause said splitter piston to displace from said initial position to a position in which said splitter gear is in ON position, whereby an interlock is accomplished which prevents a splitter ON condition when said low range chamber is pressurized.

2. A system for controlling the gear range selection of a compound transmission including a range gear positionable to provide a LOW or HIGH gear range and a splitter gear positionable to provide a splitter ON or OFF position comprising:
   - means for positioning said range gear in LOW or HIGH position including first and second selectively pressurizable opposing chambers divided by a range piston;
   - said range piston being connected to said range gear to facilitate positioning thereof to provide LOW gear range in response to pressurization of said first chamber and high gear range in response to pressurization of said second chamber;
   - means for positioning said splitter gear in ON or OFF position including third and fourth chambers divided by a splitter piston;
   - means for pressurizing said third chamber;
   - means for selectively pressurizing and depressurizing said fourth chamber;
   - said splitter piston being connected to said splitter gear to facilitate positioning thereof to provide splitter OFF condition upon pressurization of said third and said fourth chamber and splitter ON condition upon depressurization of said fourth chamber and pressurization of said third chamber; and
   - means for depressurizing said foruth chamber including a valve having a first closed position and a second open position which permits depressurization of said fourth chamber through said first chamber of said range gear whereby depressurization of said fourth chamber will be prevented and said splitter will remain OFF when said first chamber is pressurized and said range gear is in LOW range.

* * * * *